Patented Oct. 6, 1931

1,826,433

UNITED STATES PATENT OFFICE

GUSTAV PISTOR, OF LEIPZIG, AND ROBERT SUCHY AND EMIL REUBKE, OF BITTERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF SIMULTANEOUSLY VOLATILIZING PHOSPHORUS AND PRODUCING LATENT HYDRAULIC BINDERS

No Drawing. Application filed February 10, 1928, Serial No. 253,516, and in Germany February 10, 1927.

This invention relates to the simultaneous production of phosphorus or phosphoric acid and latent-hydraulic binders. It has been repeatedly proposed in the thermic production of phosphorus or phosphoric acid to substitute aluminous substances for the usually added silicic acid, in order to obtain slags having hydraulic properties enabling them to be used without further modification as hydraulic cements. However, when in this case the ratio of raw materials is adjusted so as to yield a slag resembling in composition a Portland cement clinker, the required high contents of lime (from 62–65%) prove to be an obstacle in carrying out this process, as a certain amount of calcium carbide is simultaneously produced which forms a most undesirable contamination of the slag product.

Now we have found that such difficulty does not arise when the furnace charge is composed in such a manner that when treating phosphates—in which the phosphoric acid is combined with lime or alumina—with carbon sufficient to reduce the pentoxide of phosphorus and with the additions of the aluminous or silicious material required, a slag containing about 16.5 to 18.7% $Al_2O_3$, 30.8 to 33.5% $SiO_2$, and 40 to 50% CaO is obtained. By melting down a mixture of this composition the phosphorus is completely volatilized and a slag is obtained forming, after granulation, a latent-hydraulic binder and excellently suitable for making blast-furnace cements. As an advantage of this process, as compared with the production of a slag immediately suitable as a Portland cement, it has been recognized that it is no longer necessary to endeavor to obtain an absolutely uniform composition of the slag, so that a certain amount of variation in the composition of the charge will do no harm, as the ratio between silicic acid and alumina may be varied within wider limits than is consistent with the immediate production of Portland Cement.

The process may be carried out continuously either in an electric or in a shaft furnace, carbon serving as a reducing agent and in the latter case the quantity of carbon being correspondingly increased at the same time, the surplus serving for the generation of the heat required in carrying out the process. In this case an excess in air-blast will cause also phosphoric acid to be present in the gaseous products besides phosphorus.

The resulting slag is ground in the well-known manner with a Portland cement clinker to produce blast-furnace cement, the Portland cement clinker being produced either from the usual raw materials, or from part of the slag obtained in this process by adding the required calcareous materials.

The described process enables us likewise to produce a slag best adapted for being added to a cement clinker of a given composition. Futhermore, when selecting as additional material a suitable kind of clay, also cheap raw phosphates rich in silicic acid may be employed without impairing the quality of the slag. The important economic and technical advantages of the invention also appear in comparison with the blast-furnace process, in which the composition of the slag is determined by the quality of the minerals employed and the quality of the iron produced in the blast-furnace.

Examples 1. 100 parts of a raw phosphate containing 50% CaO, 2% $Al_2O_3$, 4% $SiO_2$, 35% $P_2O_5$ are melted in an electric furnace with 50 parts of clay containing 56% $SiO_2$ and 32% $Al_2O_3$ and with 24 parts of a well dried coke to produce phosphorus. The same quantities of said raw-materials, mixed with a further quantity of 80 parts of coke for heating the charge, are to be employed when the process shall be performed on an air blast shaft furnace to produce phosphorus and phosphoric acid. A slag is obtained composed of about 50% CaO, 18% $Al_2O_3$, and 32% $SiO_2$ which is excellently suitable for making a blast-furnace cement by being ground together with a Portland cement clinker.

2. 100 parts of a row phosphate containing 50% CaO, 2% $Al_2O_3$, and 4% $SiO_2$ and 35% $P_2O_5$ and a mixture of: 50 parts of clay, containing 55% $SiO_2$ and 27% $Al_2O_3$, with 4.2 parts of bauxite containing 60% $Al_2O_3$ and 12% $SiO_2$, and with 25 parts of a well dried coke are continuously fed into an electric furnace. The phosphorus and carbon monoxid are directed to a condensing plant, while a slag composed of about 50% CaO, 18% $Al_2O_3$ and 32% $SiO_2$ having excellent hydraulic properties is tapped off from time to time.

3. 143 parts of a mixture of raw phosphates, containing 50 parts CaO, 10.5 parts $Al_2O_3$, 22 parts $SiO_2$ and 48 parts $P_2O_5$, with 18.3 parts of clay containing 63% $SiO_2$ and 28% $Al_2O_3$ and with 40 parts of coke are treated as described in example 2; the resulting slag contains 50% CaO 16.5% $Al_2O_3$, and 33.5% $SiO_2$ and is likewise excellently adapted for making a blast-furnace cement.

4. A mixture of 76.4 parts of an aluminum phosphate, (for instance "Saldana phosphate") containing 23.4% $Al_2O_3$, 39.3% $SiO_2$, and 30.5% $P_2O_5$, with 105 parts of a calcium phosphate containing 47.3% CaO, 0.7% $SiO_2$, and 35.1% $P_2O_5$ and with 41 parts of coke is continuously introduced into a phosphorus furnace and melted down. A liquid slag results composed of 30.8% $SiO_2$, 18.7% $Al_2O_3$, and 50% CaO. Whereas, in the manufacture of phosphorus according to processes of the old art, about 8 kilograms of slag are formed per 1 kilogram of phosphorus, only about 4 kilograms of slag having the quality of a letent-hydraulic binder are obtained according to our method of operating whereby an important saving of energy is involved.

It has already been proposed to split off phosphorus pentoxide from a mixture of calcium- and aluminum-phosphates by calcining the same at temperatures below the melting point of the reaction product. This method, however, has not produced satisfactory results, considerable portions of the phosphates remaining undecomposed, as ascertained by experiments.

We claim:

1. A process for simultaneously volatilizing phosphorus and producing a slag having the properties of a latent hydraulic binder, which comprises melting in the presence of carbon a mixture of a phosphate containing silicon dioxide and calcium oxide with an aluminous material, at least a part of the aluminium contents of said material being combined with phosphorus oxide and the total amounts of the calcium oxide, aluminium oxide and silicon dioxide contents of said mixture being in such proportions as to constitute after elimination of the phosphorus a slag containing aluminium oxide, silicon dioxide and calcium oxide in the proportions of about 16.5 to 18.7% $Al_2O_3$, 30.8 to 33.5% $SiO_2$, and 40 to 50% CaO.

2. A process for simultaneously volatilizing phosphorus and producing a slag having the properties of a latent hydraulic binder, which comprises melting in the presence of carbon a mixture of a phosphate containing silicon dioxide and calcium oxide with an aluminous material, one part of the aluminium content of the said material being combined with phosphorus oxide and another part combined with silicon dioxide, the total amounts of the calcium oxide, aluminium oxide and silicon dioxide contents of said mixture being in such proportions as to constitute after elimination of the phosphorus a slag containing aluminium oxide, silicon dioxide and calcium oxide in the proportions of about 16.5 to 18.7% $Al_2O_3$, 30.8 to 33.5% $SiO_2$, and 40 to 50% CaO.

3. A process of simultaneously volatilizing phosphorus and producing a slag having the properties of a latent hydraulic binder, which comprises melting in the presence of carbon a mixture of a phosphate containing silicon dioxide and calcium oxide with an aluminium phosphate, further a quantity of clay, also a quantity of bauxite, the total amounts of the calcium oxide, aluminium oxide and silicon dioxide contents of the said mixture being in such proportions as to constitute after elimination of the phosphorus a slag containing aluminium oxide, silicon dioxide and calcium oxide in the proportions of about 16.5 to 18.7% $Al_2O_3$, 30.8 to 33.5% $SiO_2$, and 40 to 50% CaO.

4. A process of simultaneously volatilizing phosphorus and producing a slag having the properties of a latent hydraulic binder, which comprises melting a mixture of about 76.4 parts of an aluminium phosphate containing 23.4% $Al_2O_3$, 39.3% $SiO_2$, and 30.5% $P_2O_5$, with 105 parts of a calcium phosphate containing 47.3% CaO, 0.7% $SiO_2$, and 35.1% $P_2O_5$, with 41 parts of coke.

5. A process for simultaneously volatilizing phosphorus and producing a slag having the properties of a latent hydraulic binder, which comprises melting in the presence of carbon a mixture of a phosphate containing silicon dioxide and calcium oxide with an aluminous material, at least a part of the aluminium contents of said material being combined with phosphorus oxide and the total amounts of the calcium oxide, aluminium oxide and silicon dioxide contents of said mixture being in such proportions as to constitute after elimination of the phosphorus a slag containing about 16.5 to 18.7% of aluminium oxide.

In testimony whereof we have hereunto set our hands.

GUSTAV PISTOR.
ROBERT SUCHY.
EMIL REUBKE.